United States Patent
Chuang

(10) Patent No.: US 11,753,100 B2
(45) Date of Patent: Sep. 12, 2023

(54) BICYCLE LAMP CAPABLE OF QUICKLY ATTACHING TO SADDLE

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 0 days.

(21) Appl. No.: 17/954,427

(22) Filed: Sep. 28, 2022

(65) Prior Publication Data

US 2023/0174184 A1 Jun. 8, 2023

(30) Foreign Application Priority Data

Dec. 7, 2021 (TW) .................................. 110145725

(51) Int. Cl.
*B62J 6/04* (2020.01)
*B62J 6/16* (2020.01)
*B62J 1/28* (2006.01)

(52) U.S. Cl.
CPC . *B62J 6/04* (2013.01); *B62J 1/28* (2013.01); *B62J 6/16* (2013.01)

(58) Field of Classification Search
CPC .................... B62J 1/28; B62J 6/04; B62J 6/16
See application file for complete search history.

(56) References Cited

U.S. PATENT DOCUMENTS

| 5,561,414 A * | 10/1996 | Chin ........................ B62J 6/04 340/432 |
| 7,431,393 B1 * | 10/2008 | Huang ...................... B62J 6/04 297/196 |
| 2017/0106929 A1 * | 4/2017 | Deckard ................... B62J 1/28 |
| 2017/0183050 A1 * | 6/2017 | Ling ......................... B62J 1/28 |
| 2022/0017171 A1 * | 1/2022 | Chuang .................... B62J 9/26 |

FOREIGN PATENT DOCUMENTS

TW          I718974 B          2/2021

* cited by examiner

*Primary Examiner* — Arman B Fallahkhair
(74) *Attorney, Agent, or Firm* — Karin L. Williams; Alan D. Kamrath; Mayer & Williams PC

(57) ABSTRACT

A bicycle lamp includes a first adhesive layer provided with an external adhesive surface disposed on a first surface thereof and adapted to adhere to a bicycle saddle, a coupling module adhered to a second surface of the first adhesive layer opposite to the first surface, and a luminaire connectable to the coupling module. The luminaire is configured to be fixed in relation to the bicycle saddle or detached from the bicycle saddle through the coupling module.

4 Claims, 11 Drawing Sheets

BICYCLE LAMP CAPABLE OF QUICKLY ATTACHING TO SADDLE

BACKGROUND

The present invention relates to a lamp for a bicycle and, more particularly, to a bicycle lamp adapted for quickly attaching to a bicycle saddle.

Taiwan Patent No. TWI718974 discloses a bicycle saddle accessory coupling device, which includes a body, a first accessory, a second accessory, and a positioning unit. The body includes an attaching portion coupled to a bicycle saddle, a first connecting portion, and a second connecting portion located between the attaching portion and the first connecting portion. The first accessory includes a first guiding portion removably connected to the first connecting portion and a first coupling portion. The second accessory includes a second guiding portion removably connected to the second connecting portion and a second coupling portion. The positioning unit is disposed on the body and removably coupled to the first and coupling portions. Thus, the first and second accessories can indirectly attach to the bicycle saddle through the body.

However, the bicycle saddle accessory coupling device is attached to the bicycle saddle by clamping the rails of the saddle with its attaching portion, and a clamping mechanism of the attaching portion is fastened by screws, so that accessory coupling device needs a screwdriver for tightening the screws at regular intervals to ensure the tightness of the clamping mechanism.

Thus, a need exists for a novel bicycle lamp to mitigate and/or obviate the above disadvantages.

SUMMARY

An objective of the present invention is to provide a bicycle lamp including a first adhesive layer, a coupling module, and a luminaire. The first adhesive layer is provided with an external adhesive surface disposed on a first surface thereof and adapted to adhere to a bicycle saddle. The coupling module is adhered to a second surface of the first adhesive layer opposite to the first surface. The luminaire is connectable to the coupling module and configured to be fixed in relation to the bicycle saddle or detached from the bicycle saddle through the coupling module.

In a first embodiment, the coupling module includes a first hook-and-loop fastener, a second hook-and-loop fastener, and a second adhesive layer. The first hook-and-loop fastener is adhered to the second surface of the first adhesive layer. A first face of the second adhesive layer is adhered to the luminaire, and a second face of the second adhesive layer is adhered to the second hook-and-loop fastener. The second hook-and-loop fastener is detachably engageable with the first hook-and-loop fastener. The luminaire is fixed in relation to the bicycle saddle when the second hook-and-loop fastener is engaged with the first hook-and-loop fastener. The luminaire is detached from the bicycle saddle when the second hook-and-loop fastener is detached from the first hook-and-loop fastener.

In a second embodiment, the coupling module includes a support base adhered to the second surface of the first adhesive layer. The luminaire is slidably connected to the support base or detached from the support base.

In the second embodiment, the support base is provided with a top portion, a first side portion, and a second side portion. The top portion is adhered to the second surface of the first adhesive layer. The first side portion and the second side portion are respectively connected to two opposite sides of the top portion. An internal surface of the first side portion protrudes a first sliding flange. An internal surface of the second side portion protrudes a second sliding flange. A first side of the luminaire is recessed a first sliding groove and a second side of the luminaire is recessed a second sliding groove. The first sliding flange is slidably engaged with the first sliding groove. The second sliding flange is slidably engaged with the second sliding groove.

In the second embodiment, the first side portion connects a flexible toggle switch with an engaging flange. The first side of the luminaire is provided with an engaging recess. The flexible toggle switch is able to elastically, deform so that the engaging flange is engaged with or disengaged from the engaging recess. The luminaire cannot be detached from the support base when the engaging flange is engaged with the engaging recess.

In a third embodiment, the support base is provided with a top portion adhered to the second surface of the first adhesive layer. A face of the top portion opposite to the first adhesive layer protrudes a sliding flange. A side of the luminaire is recessed a sliding groove slidably engaged with the sliding flange.

In the third embodiment, the support base is provided with a holding portion extended from the top portion. The holding portion has a magnet member. One end of the luminaire has an attracted member magnetically attracted with the magnet member when the luminaire is connected to the support base.

In the third embodiment, the holding portion protrudes a positioning flange disposed adjacent to the magnet member. The end of the luminaire is provided with a positioning recess disposed adjacent to the attracted member. The positioning flange is engaged with the positioning recess when the luminaire is connected to the support base.

The present invention will become clearer in light of the following detailed description of illustrative embodiments of this invention described in connection with the drawings.

DETAILED DESCRIPTION

Figure 1:
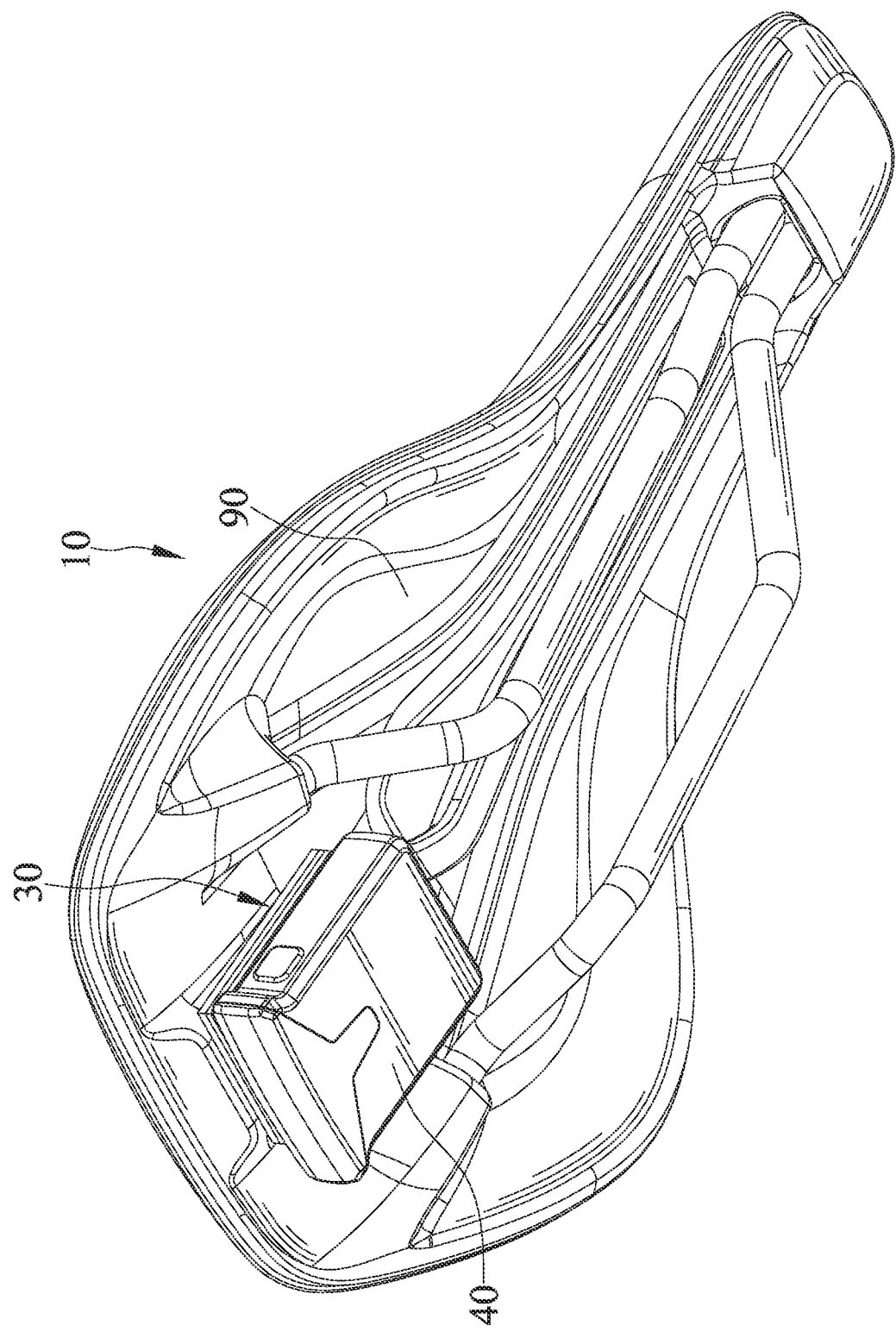
FIG. 1 is a perspective view of a bicycle lamp of a first embodiment according to the present invention.
Figure 2:
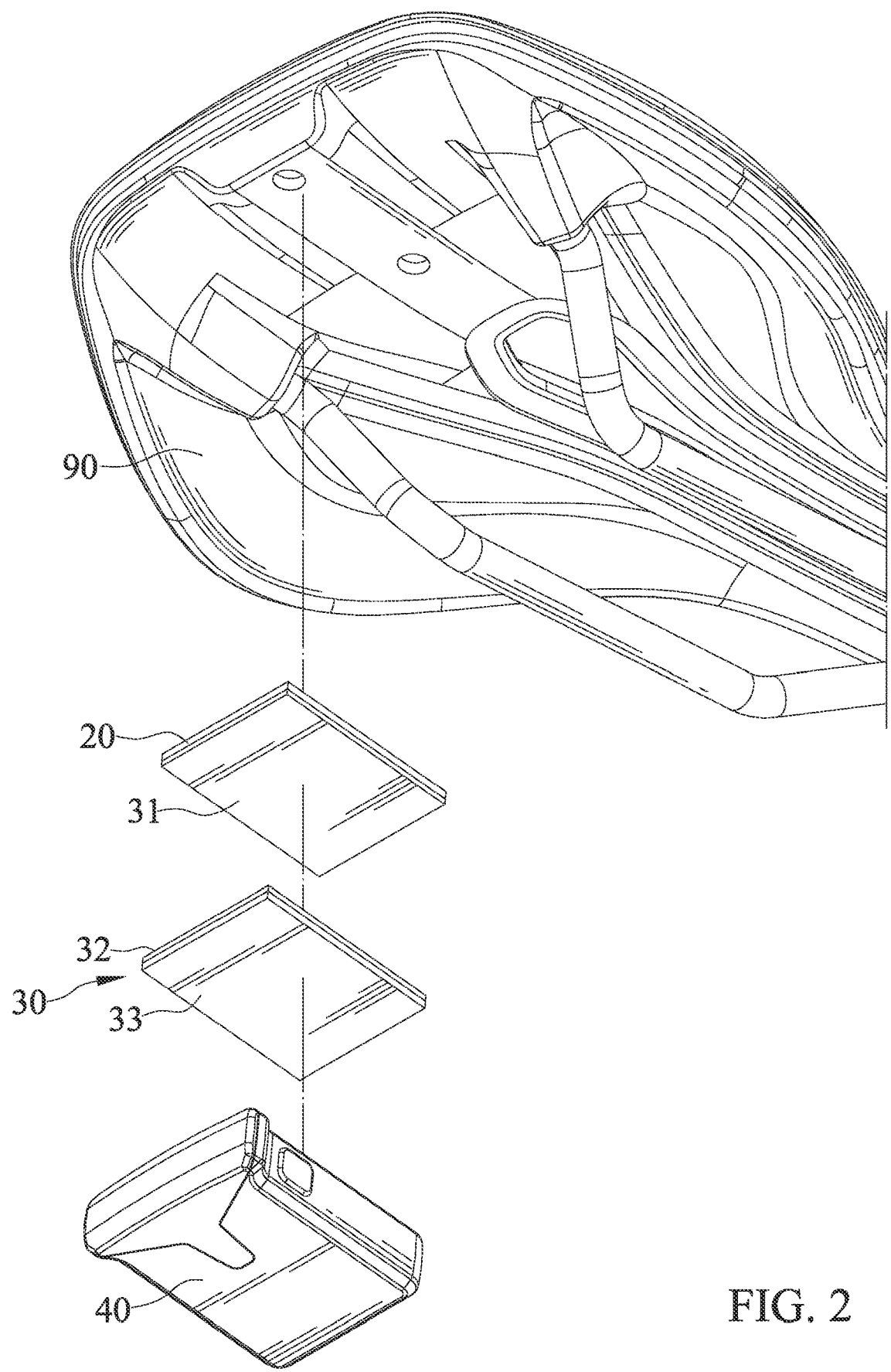
FIG. 2 is an exploded perspective view of the bicycle lamp of FIG. 1.
Figure 3:
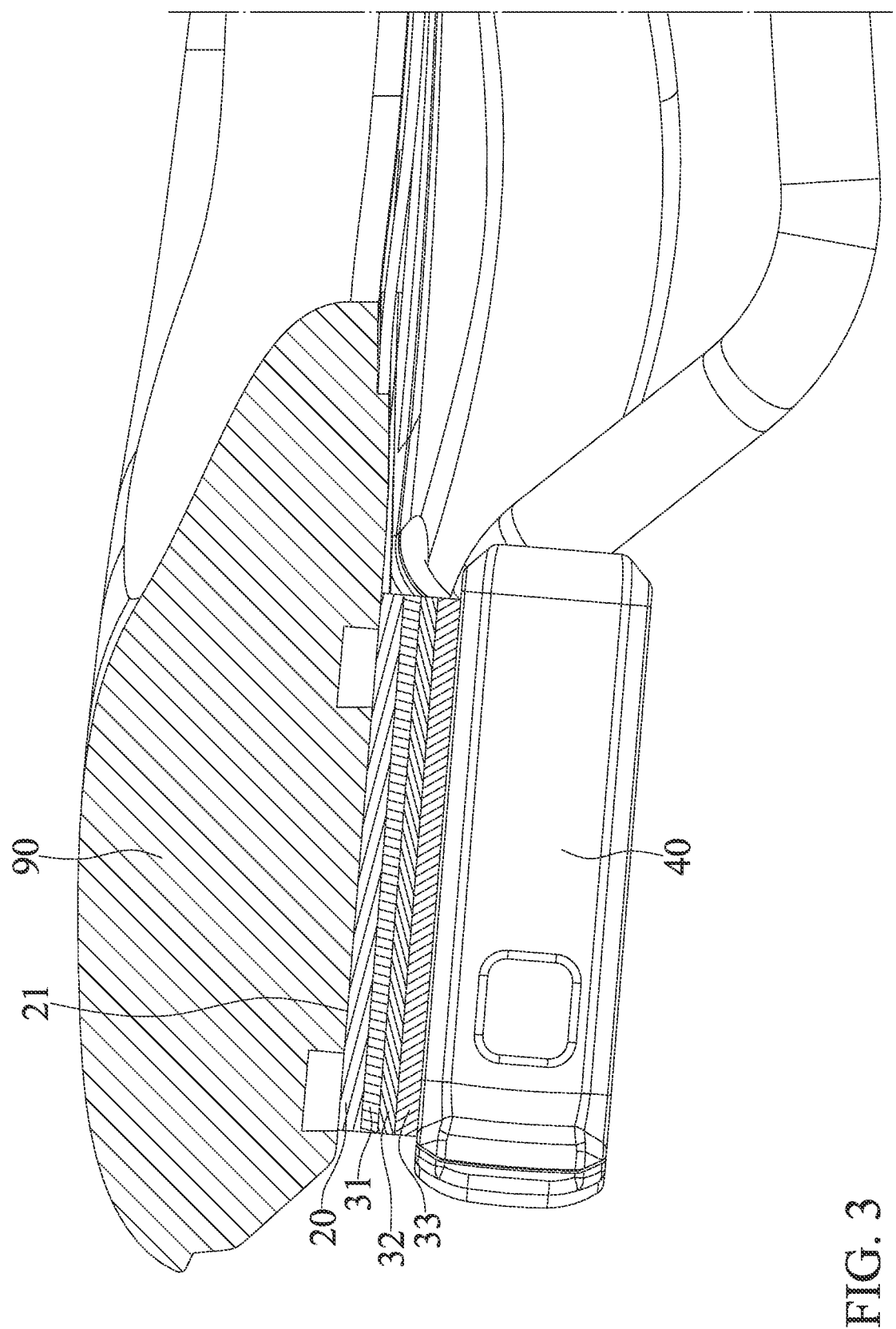
FIG. 3 is a cross sectional view of the bicycle lamp of FIG. 1.
Figure 4:
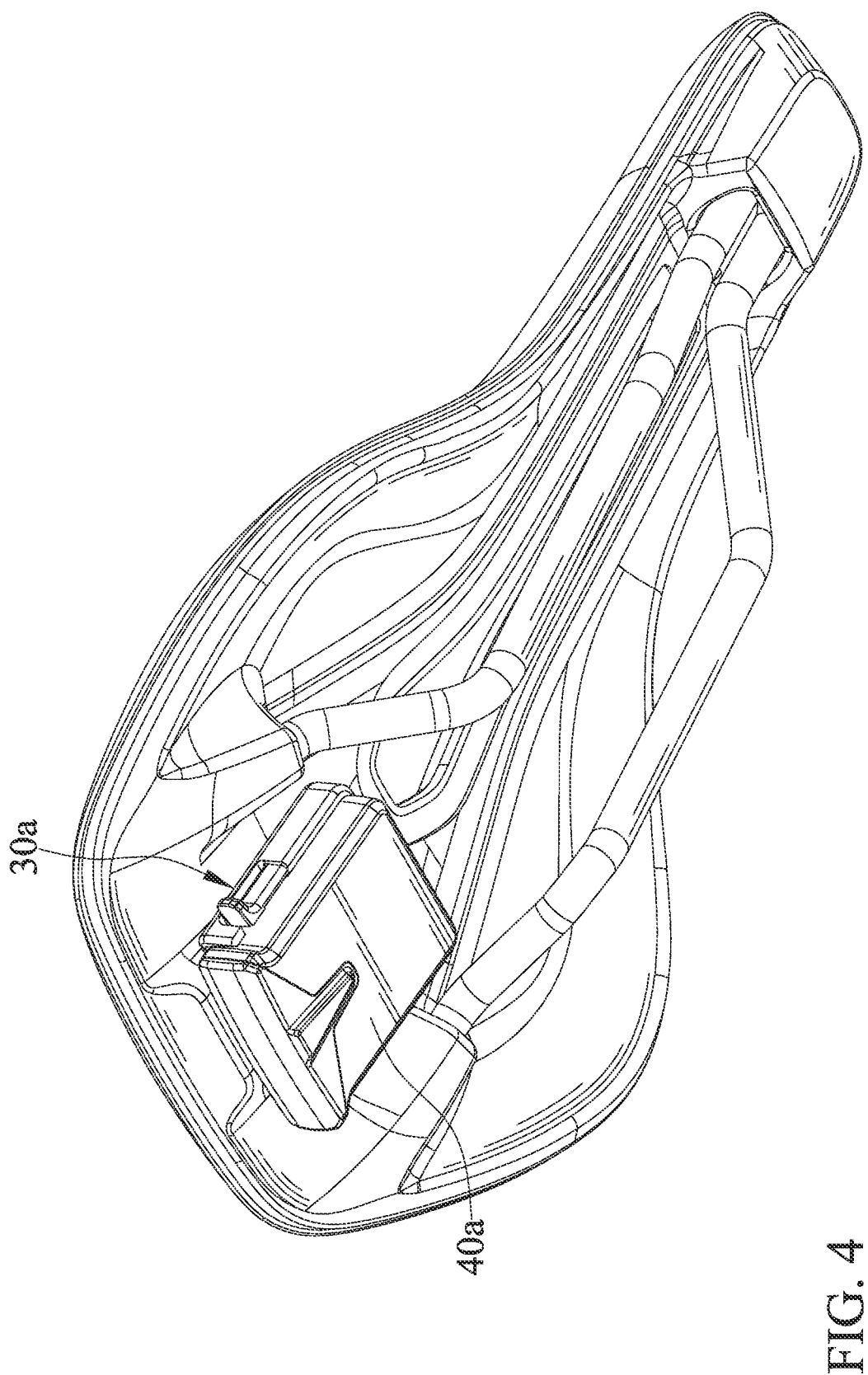
FIG. 4 is a perspective view of a bicycle lamp of a second embodiment according to the present invention.
Figure 5:
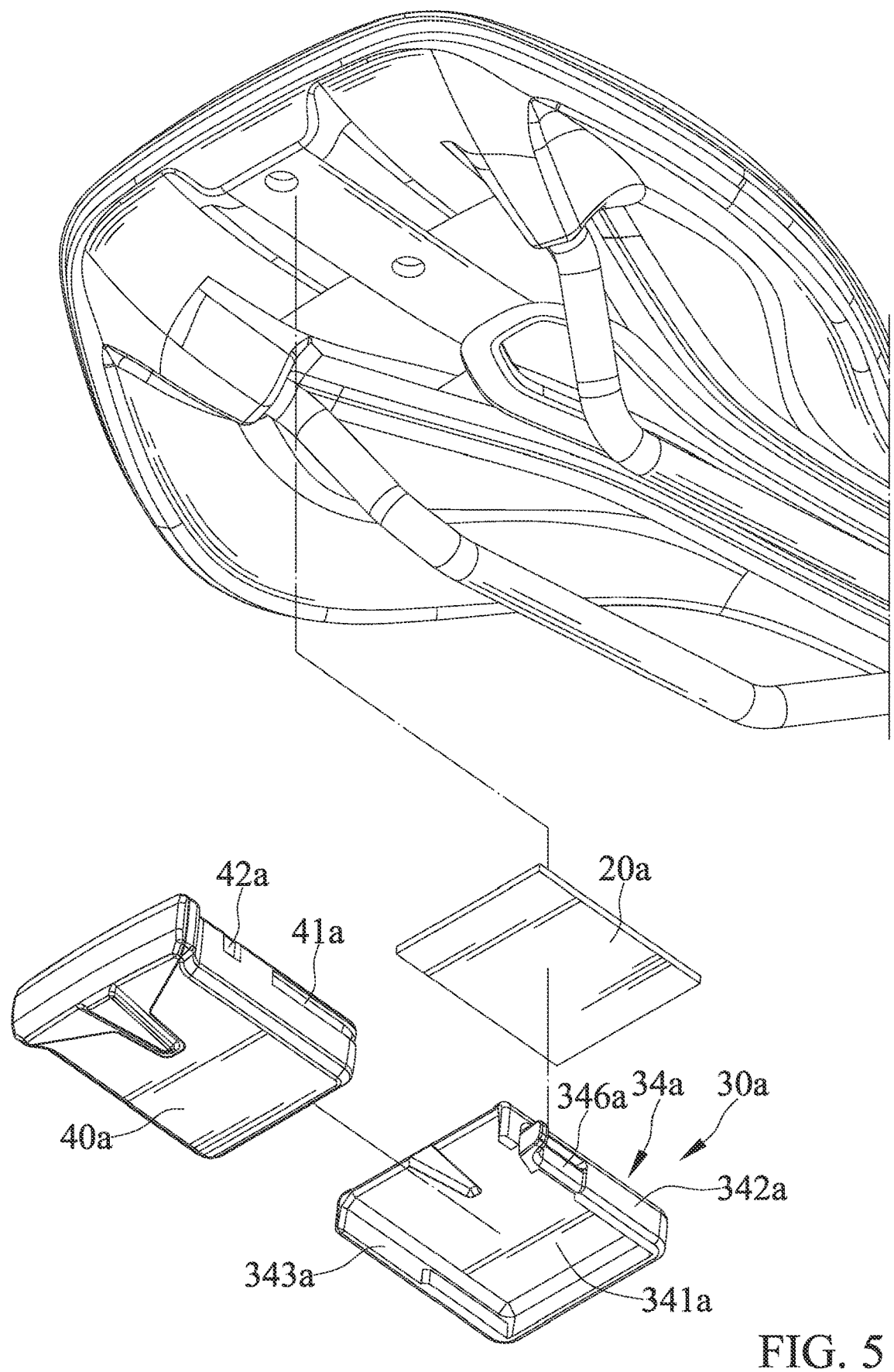
FIG. 5 is an exploded perspective view of the bicycle lamp of FIG. 4.
Figure 6:
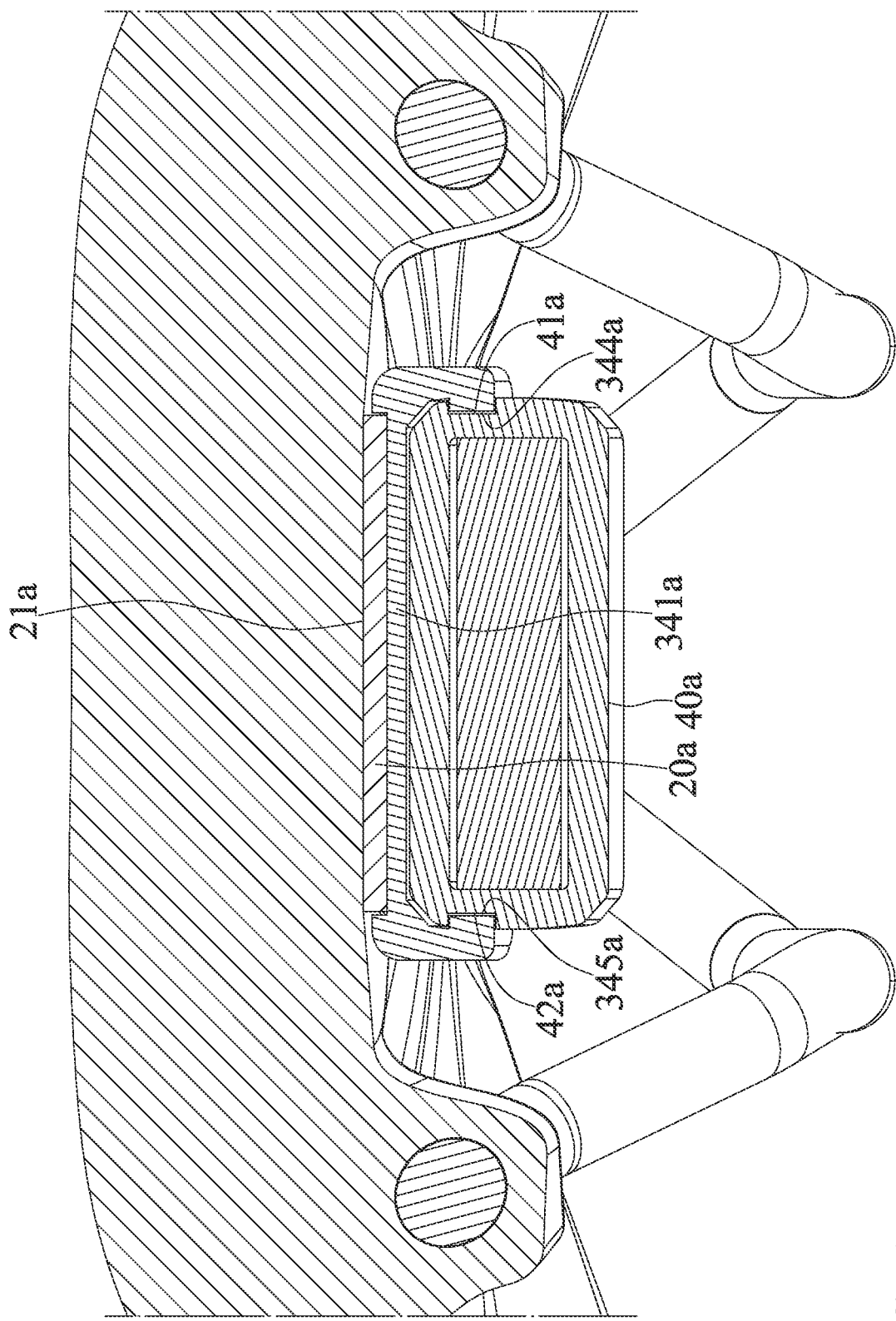
FIG. 6 is a cross sectional view of the bicycle lamp of FIG. 4.
Figure 7:
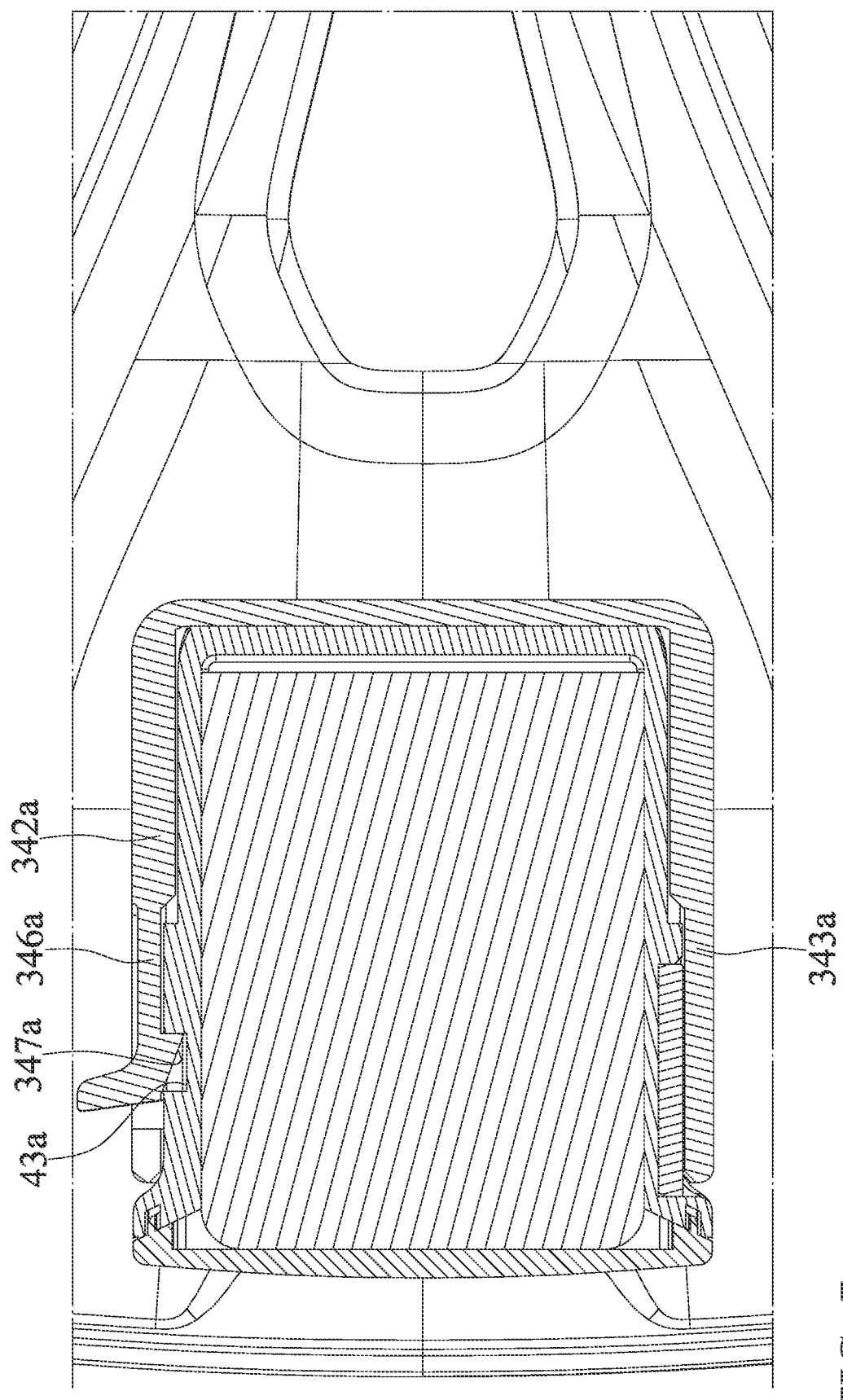
FIG. 7 is another cross sectional view of the bicycle lamp of FIG. 4.
Figure 8:
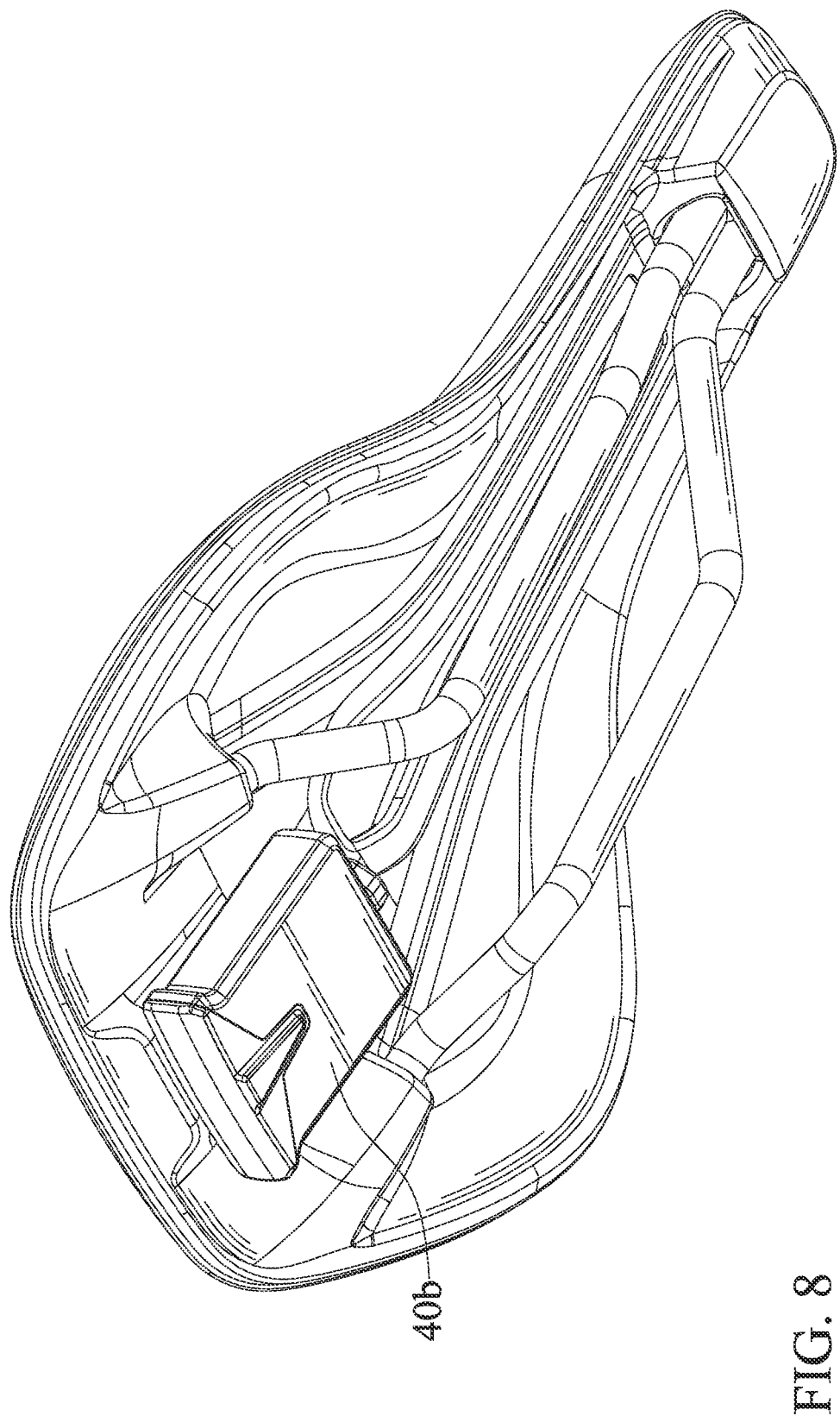
FIG. 8 is a perspective view of a bicycle lamp of a third embodiment according to the present invention.
Figure 9:
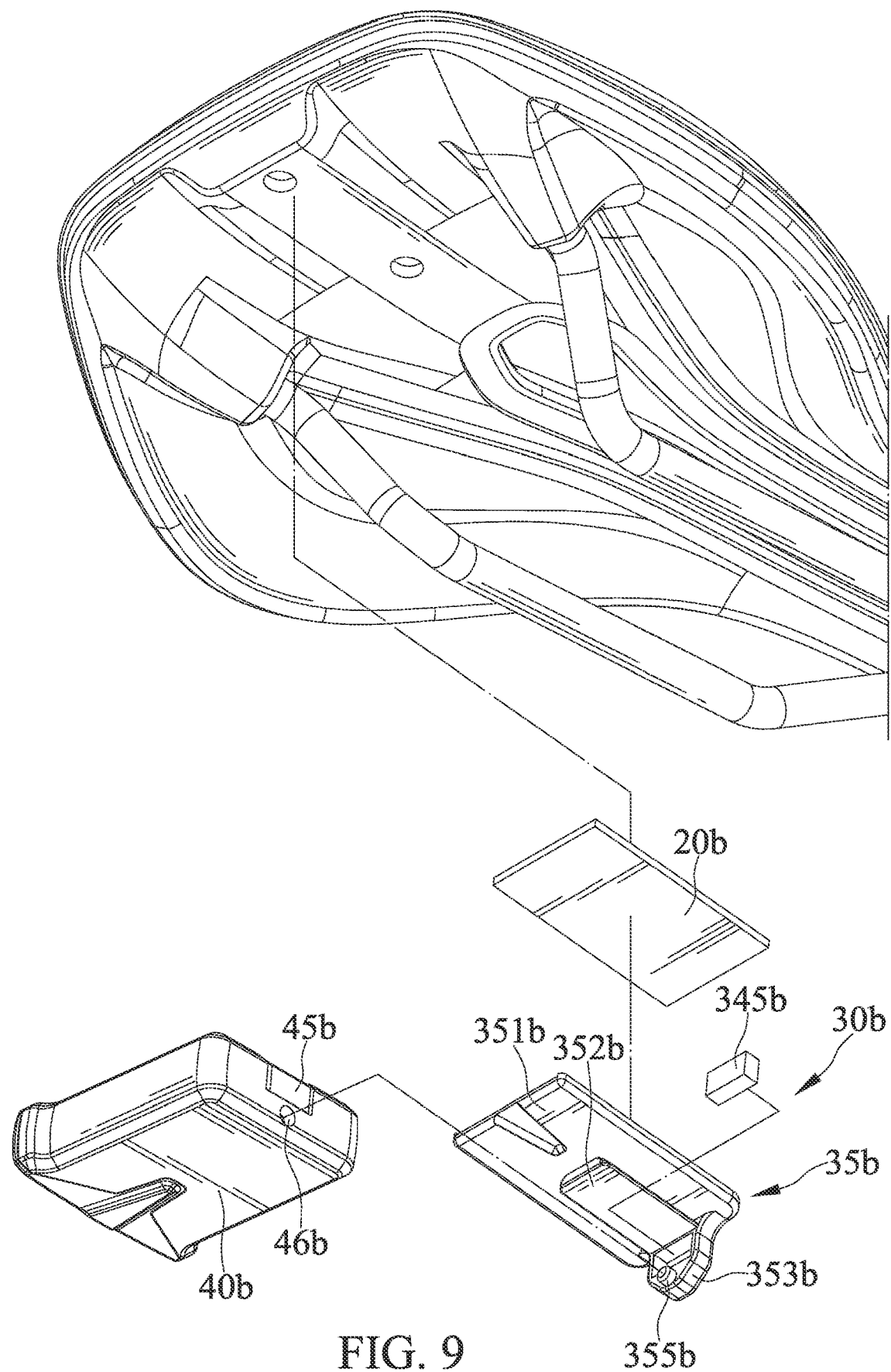
FIG. 9 is an exploded perspective view of the bicycle lamp of FIG. 8.
Figure 10:
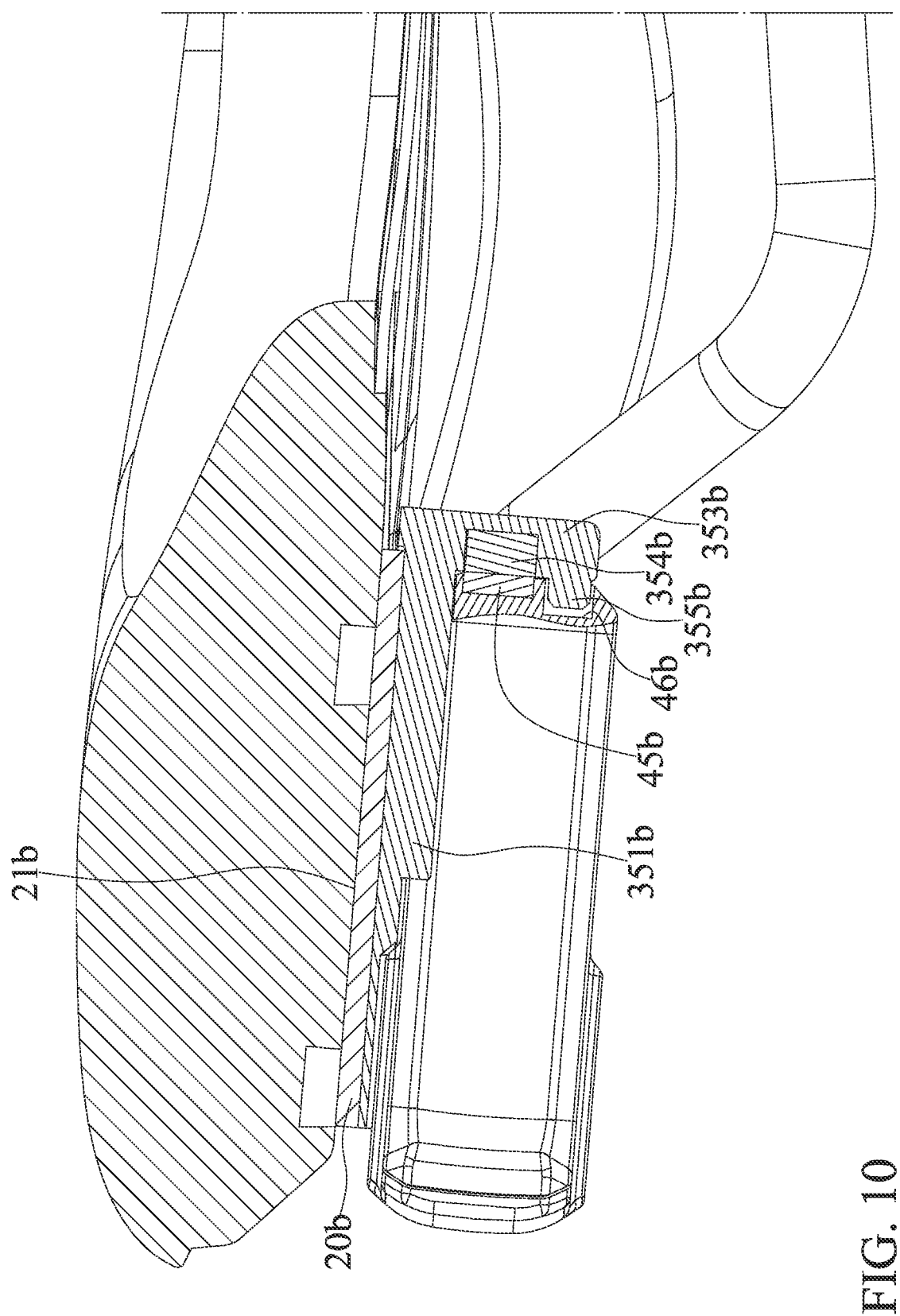
FIG. 10 is a cross sectional view of the bicycle lamp of FIG. 8.
Figure 11:
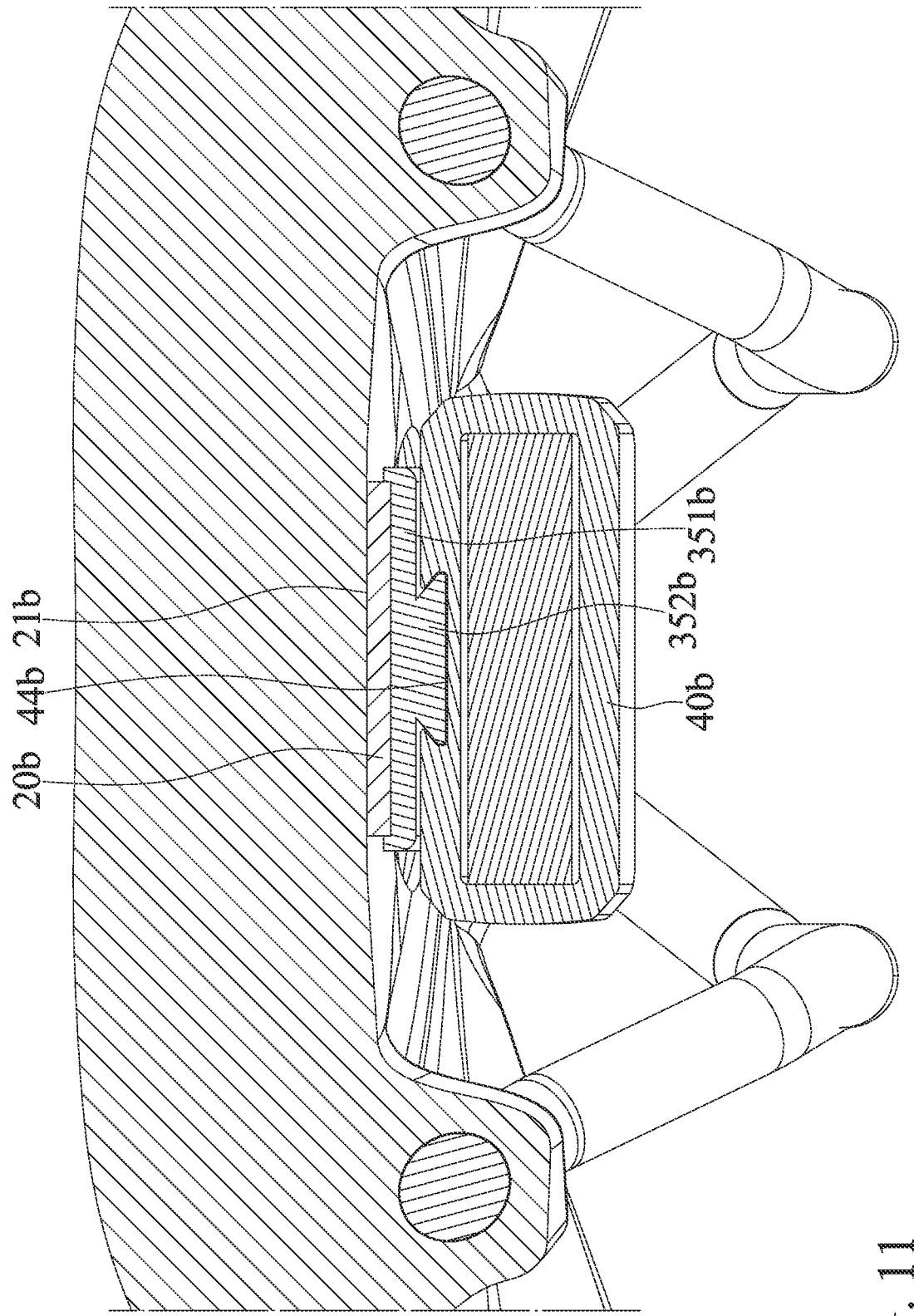
FIG. 11 is another cross sectional view of the bicycle lamp of FIG. 8.

FIGS. 1-3 show a bicycle lamp 10 of a first embodiment according to the present invention. The bicycle lamp 10 includes a first adhesive layer 20, a coupling module 30, and a luminaire 40.

The first adhesive layer 20 is provided with an external adhesive surface 21 disposed on a first surface thereof, and the external adhesive surface 21 is adapted to be adhered to a bicycle saddle 90.

The coupling module 30 is adhered to a second surface of the first adhesive layer 20 opposite to the first surface.

The luminaire 40 is connectable to the coupling module 30 and configured to be fixed in relation to the bicycle saddle 90 or detached from the bicycle saddle 90 through the coupling module 30.

In the embodiment, the coupling module 30 includes a first hook-and-loop fastener 31, a second hook-and-loop fastener 32, and a second adhesive layer 33. The first hook-and-loop fastener 31 is adhered to the second surface of the first adhesive layer 20. A first face of the second adhesive layer 33 is adhered to the luminaire 40, and a second face of the second adhesive layer 33 is adhered to the second hook-and-loop fastener 32. The second hook-and-loop fastener 32 is detachably engageable with the first hook-and-loop fastener 31. The luminaire 40 is fixed in relation to the bicycle saddle 90 when the second hook-and-loop fastener 32 is engaged with the first hook-and-loop fastener 31. The luminaire 40 is detached from the bicycle saddle 90 when the second hook-and-loop fastener 32 is detached from the first hook-and-loop fastener 31.

Therefore, the bicycle lamp 10 can provide a quick coupling structure for attaching to the bicycle saddle, and the bicycle lamp 10 does not need screws and tools to attach to the bicycle saddle.

FIGS. 4-7 show a bicycle lamp of a second embodiment according to the present invention. The second embedment is substantially the same as the first embodiment. The main differences are that the coupling module 30a further includes a support base 34a adhered to the second surface of the first adhesive layer 20a opposite to the external adhesive surface 21a. The luminaire 40a is slidably connected to the support base 34a or detached from the support base 34a.

The support base 34a is provided with a top portion 341a, a first side portion 342a, and a second side portion 343a. The top portion 341a is adhered to the second surface of the first adhesive layer 20a. The first side portion 342a and the second side portion 343a are respectively connected to two opposite sides of the top portion 341a. An internal surface of the first side portion 342a protrudes a first sliding flange 344a, and an internal surface of the second side portion 343a protrudes a second sliding flange 345a. A first side of the luminaire 40a is recessed a first sliding groove 41a, and a second side of the luminaire 40a is recessed a second sliding groove 42a. Thus, the first sliding flange 344a is slidably engaged with the first sliding groove 41a, and the second sliding flange 345a is slidably engaged with the second sliding groove 42a.

Furthermore, the first side portion 342a connects a flexible toggle switch 346a with an engaging flange 347a adjacent to the second side portion 343a. The first side of the luminaire 40a is provided with an engaging recess 43a. The flexible toggle switch 346a is able to elastically deform so that the engaging flange 347a is alternately engaged with or disengaged from the engaging recess 43a. Thus, the luminaire 40a cannot be detached from the support base 34a when the engaging flange 347a is engaged with the engaging recess 43a.

FIGS. 8-11 show a bicycle lamp of a third embodiment according to the present invention. The third embedment is substantially the same as the first embodiment. The main differences are that the coupling module 30b further includes a support base 35b adhered to the second surface of the first adhesive layer 20b. The luminaire 40b is slidably connected to the support base 35b or detached from the support base 35b.

The support base 35b is provided with a top portion 351b adhered to the second surface of the first adhesive layer 20b opposite to the external adhesive surface 21b. A face of the top portion 351b opposite to the first adhesive layer 20b protrudes a sliding flange 352b, and a side of the luminaire 40b is recessed a sliding groove 44b slidably engaged with the sliding flange 352b.

The support base 35b is provided with a holding portion 353b extended from the top portion 351b. The holding portion 353b has a magnet member 354b, and one end of the luminaire 40b has an attracted member 45h magnetically attracted with the magnet member 354b when the luminaire 40b is connected to the support base 35b. In the embodiment, the attracted member 45b may be an iron plate.

Furthermore, the holding portion 353b protrudes a positioning flange 355b disposed adjacent to the magnet member 354b. The end of the luminaire 40b is provided with a positioning recess 46b disposed adjacent to the attracted member 45b, and the positioning flange 355b is engaged with the positioning recess 46b when the luminaire 40b is connected to the support base 35b.

Although specific embodiments have been illustrated and described, numerous modifications and variations are still possible without departing from the scope of the invention. The scope of the invention is limited by the accompanying claims.

The invention claimed is:

1. A bicycle lamp comprising:
 a first adhesive layer provided with an external adhesive surface disposed on a first surface thereof and configured to adhere to a bicycle saddle;
 a coupling module adhered to a second surface of the first adhesive layer opposite to the first surface; and
 a luminaire connectable to the coupling module, wherein the luminaire is configured to be fixed in relation to the bicycle saddle or detached from the bicycle saddle through the coupling module,
 wherein the coupling module includes a support base adhered to the second surface of the first adhesive layer, and wherein the luminaire is slidably connected to the support base or detached from the support base,
 wherein the support base is provided with a top portion adhered to the second surface of the first adhesive layer, wherein a face of the top portion opposite to the first adhesive layer protrudes a sliding flange, and wherein a side of the luminaire is recessed a sliding groove slidably engaged with the sliding flange,
 wherein the support base is provided with a holding portion extended from the top portion, wherein the holding portion has a magnet member, and wherein one end of the luminaire has an attracted member magnetically attracted with the magnet member when the luminaire is connected to the support base, and
 wherein the holding portion protrudes a positioning flange disposed adjacent to the magnet member, wherein the end of the luminaire is provided with a positioning recess disposed adjacent to the attracted member, and wherein the positioning flange is engaged with the positioning recess when the luminaire is connected to the support base.

2. The bicycle lamp as claimed in claim 1, wherein the support base is provided with a top portion, a first side portion, and a second side portion, wherein the top portion is adhered to the second surface of the first adhesive layer, wherein the first side portion and the second side portion are respectively connected to two opposite sides of the top portion, wherein an internal surface of the first side portion protrudes a first sliding flange, wherein an internal surface of the second side portion protrudes a second sliding flange, wherein a first side of the luminaire is recessed a first sliding groove and a second side of the luminaire is recessed a second sliding groove, wherein the first sliding flange is slidably engaged with the first sliding groove, and wherein the second sliding flange is slidably engaged with the second sliding groove.

3. The bicycle lamp as claimed in claim 2, wherein the first side portion connects a flexible toggle switch with an engaging flange, wherein the first side of the luminaire is provided with an engaging recess, wherein the flexible toggle switch is able to elastically deform so that the engaging flange is engaged with or disengaged from the engaging recess, and wherein the luminaire cannot be detached from the support base when the engaging flange is engaged with the engaging recess.

4. The bicycle lamp as claimed in claim 1, wherein the coupling module includes a first hook-and-loop fastener, a second hook-and-loop fastener, and a second adhesive layer, wherein the first hook-and-loop fastener is adhered to the second surface of the first adhesive layer, wherein a first face of the second adhesive layer is adhered to the luminaire, and a second face of the second adhesive layer is adhered to the second hook-and-loop fastener, wherein the second hook-and-loop fastener is detachably engageable with the first hook-and-loop fastener, wherein the luminaire is fixed in relation to the bicycle saddle when the second hook-and-loop fastener is engaged with the first hook-and-loop fastener, and wherein the luminaire is detached from the bicycle saddle when the second hook-and-loop fastener is detached from the first hook-and-loop fastener.

* * * * *